(12) United States Patent
Noolandi et al.

(10) Patent No.: US 6,930,668 B2
(45) Date of Patent: Aug. 16, 2005

(54) COLOR-ENABLED ELECTROPHORETIC DISPLAY AND MEDIUM

(75) Inventors: Jaan Noolandi, Mississauga (CA); James H. Sharp, Burlington (CA)

(73) Assignee: Xerox Corporation, Stamford, CT (US)

( * ) Notice: Subject to any disclaimer, the term of this patent is extended or adjusted under 35 U.S.C. 154(b) by 388 days.

(21) Appl. No.: 10/345,436

(22) Filed: Jan. 15, 2003

(65) Prior Publication Data

US 2004/0135762 A1 Jul. 15, 2004

(51) Int. Cl.[7] ............................ G09G 3/34; G02B 26/00
(52) U.S. Cl. ...................................... 345/107; 359/296
(58) Field of Search ................... 345/84, 107; 359/290, 359/296; G09G 3/34; G02B 26/00

(56) References Cited

U.S. PATENT DOCUMENTS

| | | | |
|---|---|---|---|
| 3,384,488 A | 5/1968 | Tulagin et al. | |
| 3,384,565 A | 5/1968 | Tulagin et al. | |
| 3,384,566 A | 5/1968 | Clark | |
| 3,772,013 A | * 11/1973 | Wells | ........................... 430/34 |
| 3,775,107 A | * 11/1973 | Tulagin et al. | ................. 430/38 |
| 4,009,466 A | 2/1977 | Clark | |
| 4,032,339 A | 6/1977 | Grushkin et al. | |
| 4,076,527 A | 2/1978 | Nealy | |
| 4,126,854 A | 11/1978 | Sheridon | |
| 4,143,103 A | 3/1979 | Sheridon | |
| 4,272,596 A | * 6/1981 | Harbour et al. | ................ 430/37 |
| 5,075,186 A | 12/1991 | Sheridon | |
| 5,262,098 A | 11/1993 | Crowley et al. | |
| 5,344,594 A | 9/1994 | Sheridon | |
| 5,389,945 A | 2/1995 | Sheridon | |
| 5,604,027 A | 2/1997 | Sheridon | |
| 5,708,525 A | 1/1998 | Sheridon | |
| 6,037,093 A | * 3/2000 | Hattori | ........................ 430/138 |
| 6,067,185 A | 5/2000 | Albert et al. | |
| 2003/0231162 A1 | * 12/2003 | Kishi | .......................... 345/107 |

OTHER PUBLICATIONS

E INK Web Pages "Technology" and "Active Matrix Displays" (printed Dec. 16, 2002).

"E INK, Toppan and Philips Demonstrate World's First High Resolution, Active–Matrix Color, Display with Electronic Ink," Press Release (Jul. 1, 2002).

* cited by examiner

*Primary Examiner*—Alexander Eisen
(74) *Attorney, Agent, or Firm*—Nixon Peabody LLP

(57) ABSTRACT

A display medium including a plurality of electrically photosensitive particles positioned within at least one ambipolar shell to form at least one first composite particle, and a plurality of white particles encapsulated in a plurality of insulating shells to form a plurality of second composite particles. A photoelectrophoretic display and method of photoelectrophoretic imaging are also disclosed.

21 Claims, 3 Drawing Sheets

COLOR-ENABLED ELECTROPHORETIC DISPLAY AND MEDIUM

FIELD OF THE INVENTION

The present invention relates to a color-enabled display medium, electrophoretic display, and method of imaging.

BACKGROUND OF THE INVENTION

Photoelectrophoretic imaging systems are known in the art. In particular, these imaging systems include electrically photosensitive pigment particles dispersed in a carrier liquid, arranged between an injecting electrode and a blocking electrode, which is subjected to an electric field and either simultaneously or thereafter exposed to activating electromagnetic radiation conforming to an image pattern. The blocking electrode is then removed from the surface of the pigment suspension and the remaining particulate image on the injecting electrode is fixed in place. Alternatively, the resulting image can thereafter be transferred to a receiving sheet, such as white paper, and thus the portions of the image which are deficient of pigment will appear as white in the finished copy.

The photoelectrophoretic imaging systems described above require the use of a receiving sheet, such as white paper, or removal of the blocking electrode and fixation of the image. Therefore, the above-described photoelectrophoretic imaging systems do not provide a re-useable electronic image, which is desirable for certain applications. However, electric paper is a well known embodiment of digital document media which provides an electronic image. It is comprised of bichromal balls which rotate to provide an imaging system. In particular, bichromal balls have two hemispheres, typically one black and one white, each having different electrical properties. Such bichromal balls may be used in a "twisting ball" medium for displaying an image. The twisting ball medium includes internal bichromal balls that rotate to show either black or white hemispheres in response to an externally applied electrical field which are contained in individual liquid filled spherical cavities in a transparent binder, such as a gel. The gel is then bonded between glass or plastic sheets for protection.

Alternatively, such bichromal balls may be enclosed within individual spherical shells and then a space between the ball and shell is filled with a liquid to form a microsphere so that the ball is free to rotate in response to an electrical field. The microspheres are then mixed into a substrate which can be formed into sheets or can be applied to any kind of surface. The result is a film which can form an image from an applied electrical field. The display formed using this technique allows the formation of a thin, paper-like sheet without the bulkiness and optical problems created by the need for protective cover sheets in a twisting ball medium. However, the above-described digital document media are typically limited to a monochromal (e.g., black and white) imaging system.

SUMMARY OF THE INVENTION

The present invention relates to a display medium including a plurality of colored electrically photosensitive particles positioned within at least one ambipolar shell to form at least one first composite particle, and a plurality of white particles encapsulated in a plurality of insulating shells to form a plurality of second composite particles.

The present invention also relates to a photoelectrophoretic display including a plurality of colored electrically photosensitive particles positioned within at least one ambipolar shell to form at least one first composite particle, a plurality of white particles encapsulated in a plurality of insulating shells to form a plurality of second composite particles, a first electrode, and a second electrode, wherein at least one first composite particle and the plurality of second composite particles are dispersed in a dielectric fluid between the first and second electrodes.

Another aspect of the present invention relates to a method of photoelectrophoretic imaging. This method involves subjecting a display medium to an applied electric field between first and second electrodes, wherein the display medium includes a plurality of colored electrically photosensitive particles positioned within at least one ambipolar shell to form at least one first composite particle, and a plurality of white particles encapsulated in a plurality of insulating shells to form a plurality of second composite particles, and wherein at least one first composite particle and the plurality of second composite particles are dispersed in a dielectric fluid. The display medium is also exposed to electromagnetic radiation to form an image.

A display medium in accordance with the present invention includes colored electrically photosensitive particles. The colored electrically photosensitive particles in combination with white particles in insulating shells allow the production of a re-usable, color-enabled photoelectrophoretic display.

DETAILED DESCRIPTION OF THE INVENTION

The present invention relates to a display medium including a plurality of colored electrically photosensitive particles positioned within at least one ambipolar shell to form at least one first composite particle, and a plurality of white particles encapsulated in a plurality of insulating shells to form a plurality of second composite particles. As used herein, colored particles are non-white, pigmented particles. As used herein, electrically photosensitive particles are particles which reverse net charge when exposed to light in an electric field. Such electrically photosensitive particles include photoactive particle electrophoresis (PAPE) particles, which are used in known photoelectrophoretic (PEP) techniques (see, e.g., U.S. Pat. Nos. 3,384,488, 3,384,565, and 3,384,566, which are hereby incorporated by reference in their entirety). A detailed description of suitable electrically photosensitive particles or mixtures thereof is disclosed in U.S. Pat. No. 3,384,488, which is hereby incorporated by reference in its entirety.

Figure 1A:
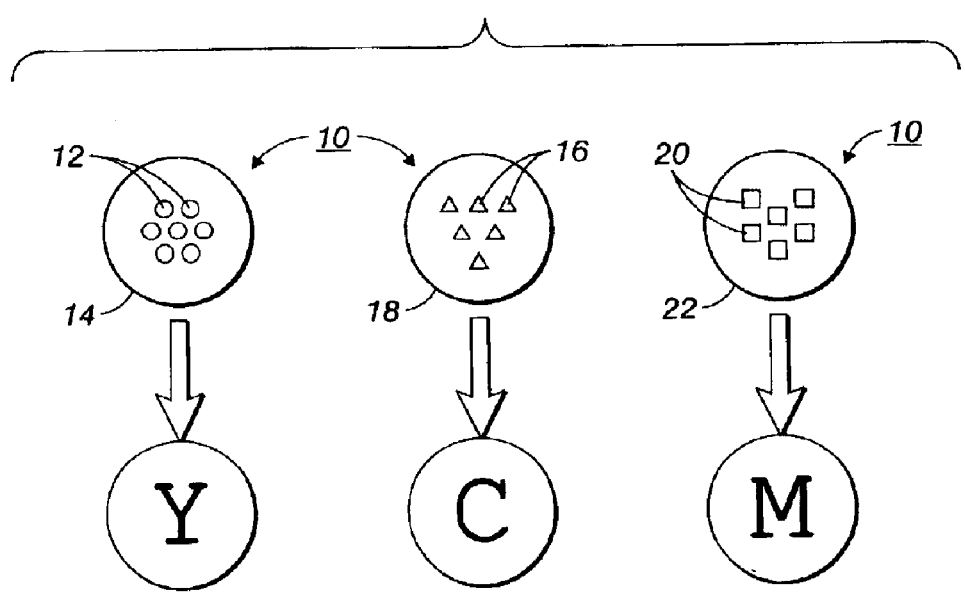
FIG. 1 is a schematic showing composite yellow, cyan, magenta, and white composite particles in accordance with one embodiment of the present invention.

Referring to FIG. 1, colored electrically photosensitive composite particles and a white composite particle are shown. In particular, in FIG. 1A, yellow, cyan, and magenta electrically photosensitive composite particles 10 are shown. More specifically, yellow, cyan, and magenta PAPE composite particles are shown. Although in the embodiment described herein, composite particles including pigment particles which correspond to the subtractive colors yellow, cyan, and magenta are shown, any color and combinations thereof of electrically photosensitive composite particles may be used. Also, any type of electrically photosensitive colored particles may be used. Moreover, any number of colored particles may be encapsulated in each shell (i.e., at least one).

The yellow composite particle includes a plurality of yellow PAPE particles 12 encapsulated within a polymer shell 14. The cyan composite particle includes a plurality of cyan PAPE particles 16 encapsulated within a polymer shell 18. The magenta composite particle includes a plurality of magenta PAPE particles 20 encapsulated within a polymer shell 22. The polymer shells 14, 18, and 22 are transparent polymer shells. This allows the color of the encapsulated PAPE particles to be viewed by a user of a device incorporating the PAPE composite particles. However, a material which is partially transparent (i.e., allows the transmission of some light) could also be used, if desired, but may impact the color of the composite particles. The polymer shells 14, 18, and 22 comprise an ambipolar transporting polymer. As used herein, an ambipolar shell allows the transport of positive and negative charge. Thus, the shells allow the transportation of charge to the encapsulated particles. In addition, as shown in FIG. 1, the shells allow composite particles of approximately the same size to be formed (the encapsulated particles may differ significantly in size). This is beneficial when forming a display in accordance with the present invention which uses, for example, a laser diode array. Moreover, encapsulation as shown in FIG. 1 decreases the occurrence of cross-mixing and contamination of different particles.

Any desired polymer shell may be used. Suitable polymers include, but are not limited to, polymers doped with hole and electron transporting small molecules, such as N,N'-bis(3-methylphenyl)-N,N'-diphenyl-(1,1'-biphenyl)-4, 4"-diamine, also known as m-TBD (a hole transporting small molecule) or an electron transporting small molecule, such as 4-n-butoxy carbonyl-9-fluorenyl malonitrile (BCFM), TNF (trinitro-9-fluorene), vinylcarbazole, and the like. Such polymers include, but are not limited to, polycarbonates, polyesters, polyvinylchloride, and polyimides. Alternatively, any other ambipolar shell may be used. The shells typically have a diameter of from about 7 to about 20 microns, however, any suitable sized shell may be used. Moreover, the composite particles need not be uniform. In addition, a single shell may be used. In particular, a honeycomb ambipolar shell with a plurality of chambers may be used (e.g., SU-8 polymer). Different colored particles may be positioned in different chambers in the honeycomb shell.

Figure 1B:
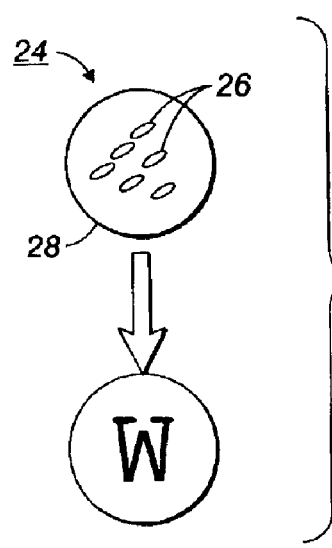

In FIG. 1B, a white composite particle 24 is shown. The white composite particle includes a plurality of $TiO_2$ particles 26 encapsulated in a polymer shell 28. Although this embodiment shows $TiO_2$ particles, any white particles may be used, such as zinc oxide. Moreover, any number of white particles may be encapsulated in each shell (i.e., at least one). The polymer shell 28 comprises an insulating polymer, such as polycarbonate, polystyrene, polyvinylchloride, or polyester. However, any insulating shell material may be used. As used herein, an insulating shell does not transport positive or negative charge. In this embodiment, the shell 28 is a transparent shell. However, a material which is partially transparent (i.e., allows the transmission of some light) could also be used. The insulating shell has a diameter of from about 3 to about 5 microns, however, any suitable sized shell may be used.

Although in the embodiment shown, only PAPE or white particles are encapsulated, other additional components may be encapsulated within the shell. Such additional components include, but are not limited to, spectral or electrical sensitizers, charge control agents, secondary colorants, or secondary electrically photosensitive materials.

The particles are encapsulated using procedures known in the art. For example, the polymer shell material (e.g., polycarbonate) may be dissolved in a solvent, such as methylene chloride, cyclohexanone, acetone, benzene, toluene, methyl ethyl ketone, or mixtures thereof. The PAPE particles or white particles are then added to the dissolved polymer and the mixture is stirred. The solvent is slowly evaporated off while stirring the mixture to form composite particles. Alternatively, the mixture may be spray-dried (spray-jetted) to form the encapsulated particles. These and other techniques for encapsulation of particles are known in the art and will not be described in detail herein.

In one embodiment of the present invention, a plurality of the colored electrically photosensitive composite particles and a plurality of the white composite particles are dispersed within a dielectric, insulating fluid. Suitable fluids include, but are not limited to, decane, dodecane, tetradecane, Sohio oil (Standard Oil, Ohio), Isopar G (Humble Oil Co., N.J.), Klearol (Witco Chemical Corp., New York City, N.Y.), molten beeswax, molten paraffin, other molten thermoplastic materials, and other saturated hydrocarbons. The fluid may be a liquid or a gas. In the dielectric fluid, the PAPE composite particles, which have an inherent net negative charge, retain their negative charge. The white particles, which are encapsulated in an insulating shell, remain neutral in the fluid. Although the present invention is described with reference to PAPE composite particles, which have net negative charge, the colored electrically photosensitive particles may have either a net negative or net positive charge. With regard to PAPE particles, the ion content of the PAPE particles and/or the fluid may be modified (e.g., with charge control agents) to achieve the desired charge for the PAPE particles, as is known in the art.

Any suitable proportion of electrically photosensitive particles and white particles to dielectric fluid may be used. Typically, from about 5 wt. % to about 20 wt. % particles in fluid may be used, with from about 60% to about 80% being white composite particles and from about 20% to about 40% being colored composite particles.

Figure 2:
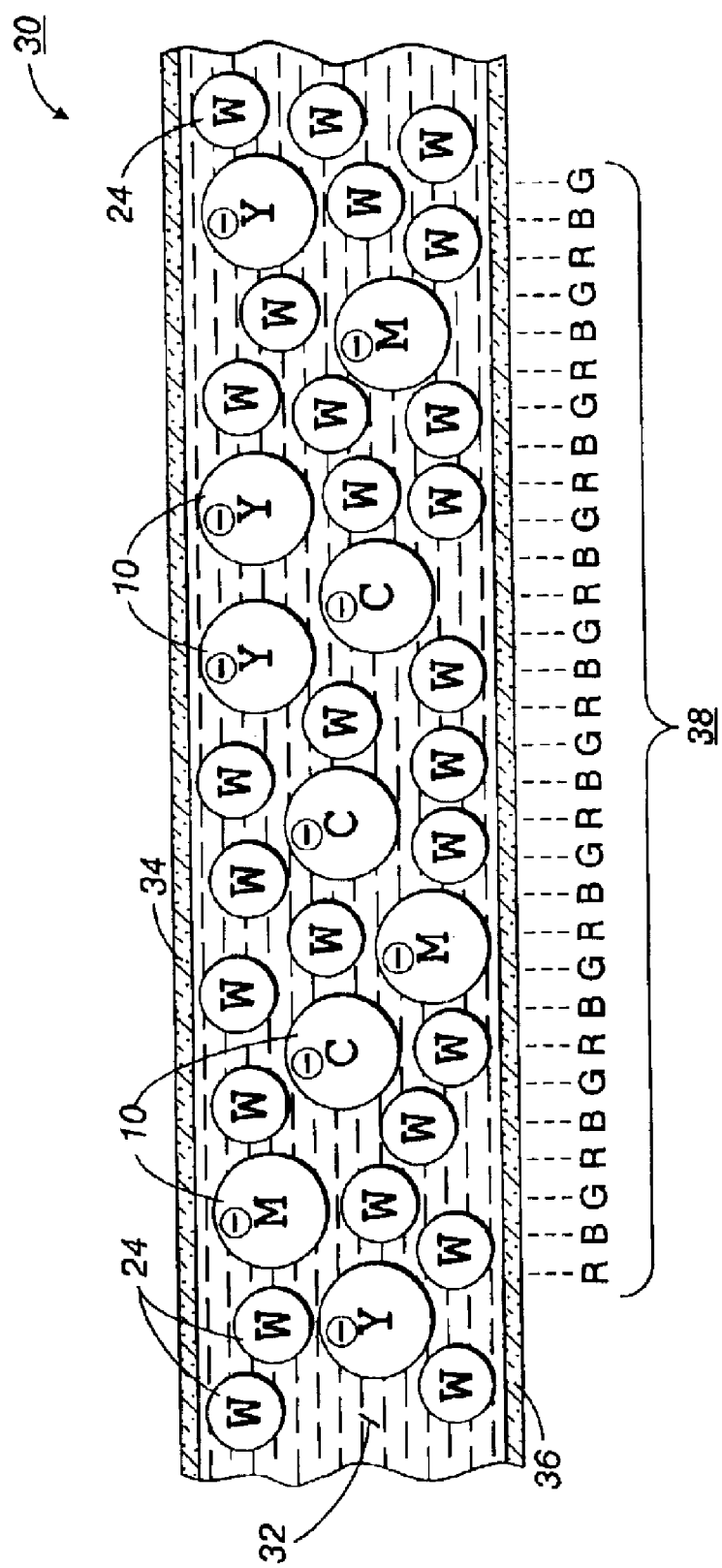
FIG. 2 is a schematic showing an inactive photoelectrophoretic display including the composite particles of FIG. 1 in accordance with one embodiment of the present invention.

Referring to FIG. 2, a photoelectrophoretic display 30 in accordance with the present invention is shown. In particular, photoelectrophoretic display 30 of FIG. 2 includes a plurality of the yellow, cyan, and magenta composite particles 10 and a plurality of white composite particles 24 dispersed in a dielectric fluid 32 to form an image suspension. The display 30 further includes a first electrode 34 and a second electrode 36 positioned such that the plurality of PAPE composite particles 10 and plurality of white composite particles 24 are dispersed in the dielectric fluid 32 between the first and second electrodes. The electrodes 34 and 36 are optically transparent, conductive strips and the first electrode 34 is positioned so that a user will view the display through the first electrode 34. Suitable materials for the first electrode include, but are not limited to, conducting glass and polymers having substantially transparent and continuously conductive coatings of conductors such as tin, indium oxide, aluminum, chromium, tin oxide, or any other suitable conductor, such as aluminized Mylar™, Tedlar™, and polyesters, polycarbonates, or polyvinylchloride coated with conductive salts, such as those of polysulfonic acid. Suitable materials for the second electrode include, but are not limited to, conductive glass (e.g., NESA™ glass (Pittsburgh Plate Glass Co.), polymers (e.g., polymers having substantially transparent and continuously conductive coatings of conductors such as tin, indium oxide, aluminum, chromium, tin oxide, or any other suitable conductor, such as aluminized Mylar™, Tedlar™, and polyesters, polycarbonates, or polyvinylchloride coated with conductive salts, such as those of polysulfonic acid), and paper coated with tin oxide. The first electrode 34 is capable of photoinjecting electrons into the composite PAPE particles and the second electrode 36 is capable of photoinjecting holes (i.e., positive charge) into the composite PAPE particles, as described below. Typically, electrode spacings of from about 40 μm to about 100 μm are used, however, any desired electrode spacing may be used. In addition, the layer of the imaging suspension between the two electrodes is typically about 10 μm to about 30 μm, however, any desired thickness may be used, as long as the first and second electrodes 34 and 36 are not in contact.

As shown in FIG. 2, a diode laser array 38 is positioned adjacent the second electrode 36. In this embodiment, the diode laser array 38 includes an orderly array of blue (B), green (G), and red (R) diode lasers. Also, in this particular embodiment, three diode lasers (blue, green, and red) are positioned within the diameter of each composite color particle. However, any suitable diode laser array based on the colored composite particles and any format may be used. Suitable diode laser arrays are known in the art and are commercially available. Moreover, any other source of electromagnetic radiation may be used.

Figure 3:
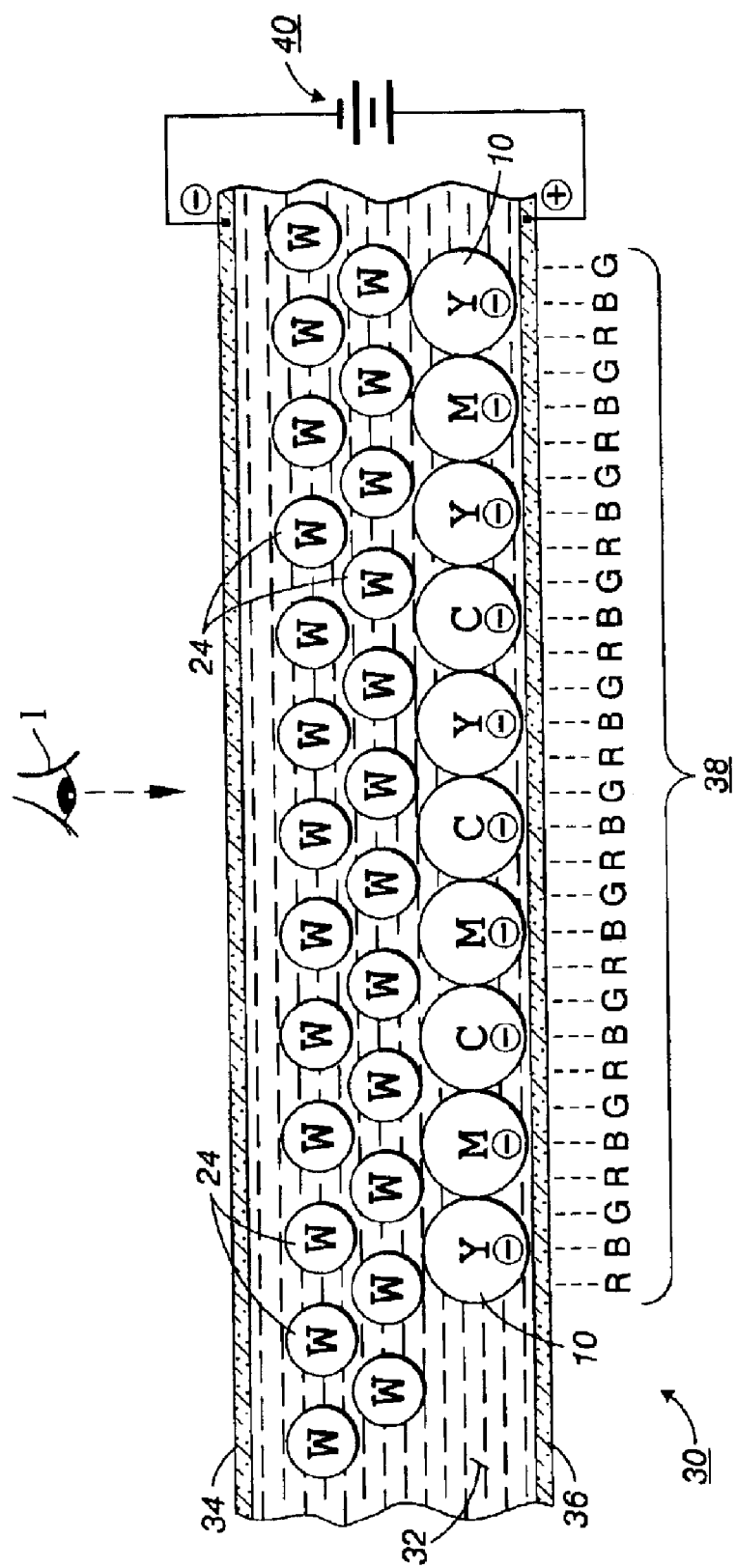
FIG. 3 is a schematic showing the photoelectrophoretic display of FIG. 2 in an activated state.

As shown in FIG. 2, the photoelectrophoretic display is inactive. The display 30 is activated by applying an electric field across the first and second electrodes 34, 36. As shown in FIG. 3, the electric field is established by a source of potential 40 having a negative terminal thereof coupled to the first electrode 34 and a positive terminal thereof coupled to the second electrode 36. Thus, in this embodiment, the first electrode 34 is negatively biased and the second electrode 36 is positively biased. However, based on the charge of the electrically photosensitive particles, the electrodes may be oppositely biased. The strength of the electric field may vary as desired, based on the desired image resolution. Voltages of from about 5 to 100 volts may be used to produce good quality images.

Referring to FIG. 3, the negatively charged PAPE composite particles 10 are attracted to the second positively biased electrode 36 and migrate to the second electrode 36, while the neutral white composite particles 24 remain located between the first electrode 34 and the PAPE composite particles attracted to the second electrode 36. When the display is viewed through the first electrode 34 in the direction of eye I, the display appears white (e.g., like a white piece of paper).

A display in accordance with the present invention may be provided as a paper-like display in very thin sheets having paper-like properties. Alternatively, the display may be formed on any desired substrate, such as a nonplanar surface.

Another aspect of the present invention relates to a method of photoelectrophoretic imaging. This method involves subjecting a display medium to an applied electric field between first and second electrodes, wherein the display medium includes a plurality of colored electrically photosensitive particles positioned within at least one ambipolar shell to form at least one first composite particle, and a plurality of white particles encapsulated in a plurality of insulating shells to form a plurality of second composite particles, wherein at least one first composite particle and the plurality of second composite particles are dispersed in a dielectric fluid. The display medium is also exposed to electromagnetic radiation to form an image.

Use of the photoelectrophoretic display of the present invention in accordance with the method of the present invention will now be described in detail. In use, the user obtains a display 30 of the present invention. The display is typically assembled as shown in FIG. 3, however, the user may combine the display medium, first and second electrodes 34, 36, the source of electromagnetic radiation (e.g., laser diode array) 38, and source of potential 40, as shown in FIG. 3 or in a different format, if necessary. The display may be provided in an active state or in an inactive state. If provided in an inactive state, the user activates the display by applying an electric field across the first and second electrodes 34, 36 using the source of potential 40. When a yellow pixel is to be displayed, a blue laser diode is activated at the position(s) desired, and the blue light passes through the transparent second electrode 36 and will be absorbed only by the yellow composite particle(s). Upon absorption of this blue light, a positive charge is imparted to the yellow composite particle(s) 10 via holes injected from the second electrode 36. In particular, upon absorption of the blue light, the electrically photosensitive particles generate an electron-hole pair and the electron is transported to the adjacent positively biased electrode. Therefore, the remaining positive charge imparts a net positive charge to the composite particle, and the composite particle migrates through the covering layer of the white composite particles 24 to the negatively biased top electrode 34. When the display is now viewed through the top electrode 34, a yellow pixel is observed on a white background at the desired position(s). In a similar manner, when a cyan pixel is required, a red diode laser is activated at the position(s) desired, and the red light passes through the transparent bottom electrode and will be absorbed only by the cyan composite particle(s). Upon absorption of this red light, the cyan composite particle(s) 10 becomes positively charged and moves through the covering layer of the white composite particles 24 to the negatively biased top electrode 34. When the display is now viewed through the top electrode 34, a cyan pixel is observed on a white background at the desired position(s). Moreover, when a magenta pixel is to be displayed, a green diode laser is activated at the position(s) desired and a magenta pixel is observed. The desired diode lasers, which are present in an integrated circuit, can be activated sequentially or simultaneously to produce the desired colored image. The display can be reconfigured to its original white state by flash exposing the top electrode with white light. In this case, any colored composite particle that has moved to the top negative electrode will absorb a component of the white light, will have a negative charge imparted to it, and will move back to the positively biased bottom electrode 36.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefor, is not intended to limit the claimed process to any order except as may be specified in the claims.

What is claimed is:

1. A display medium comprising:
   a plurality of colored electrically photosensitive particles positioned within at least one ambipolar shell to form at least one first composite particle, and
   a plurality of white particles encapsulated in a plurality of insulating shells to form a plurality of second composite particles.

2. The display medium according to claim 1 wherein at least one first composite particle and the plurality of second composite particles are dispersed in a dielectric fluid.

3. The display medium according to claim 1 wherein the colored electrically photosensitive particles are photoactive particle electrophoresis particles.

4. The display medium according to claim 3 wherein the at least one first composite particle comprises a plurality of yellow photoactive particle electrophoresis particles encapsulated in a plurality of ambipolar shells, a plurality of cyan photoactive particle electrophoresis particles encapsulated in a plurality of ambipolar shells, and a plurality of magenta photoactive particle electrophoresis particles encapsulated in a plurality of ambipolar shells.

5. The display medium according to claim 1 wherein at least one ambipolar shell is transparent or partially transparent.

6. The display medium according to claim 1 wherein the plurality of insulating shells are transparent or partially transparent.

7. A photoelectrophoretic display comprising:
   a plurality of colored electrically photosensitive particles positioned within at least one ambipolar shell to form at least one first composite particle;
   a plurality of white particles encapsulated in a plurality of insulating shells to form a plurality of second composite particles;
   a first electrode; and
   a second electrode, wherein at least one first composite particle and the plurality of second composite particles are dispersed in a dielectric fluid between the first and second electrodes.

8. The photoelectrophoretic display according to claim 7 wherein the colored electrically photosensitive particles are photoactive particle electrophoresis particles.

9. The photoelectrophoretic display according to claim 7 wherein at least one ambipolar shell is transparent or partially transparent.

10. The photoelectrophoretic display according to claim 7 wherein the plurality of insulating shells are transparent or partially transparent.

11. The photoelectrophoretic display according to claim 7 wherein the first and second electrodes are transparent.

12. The photoelectrophoretic display according to claim 7 further comprising a source of electromagnetic radiation adjacent the second electrode.

13. The photoelectrophoretic display according to claim 12 wherein the source of electromagnetic radiation is a laser diode array.

14. The photoelectrophoretic display according to claim 7 further comprising a source of potential having a negative terminal coupled to one of the first and second electrodes and a positive terminal coupled to the other of the first and second electrodes.

15. A method of photoelectrophoretic imaging comprising:
   subjecting a display medium to an applied electric field between first and second electrodes, wherein the display medium comprises a plurality of colored electrically photosensitive particles positioned within at least one ambipolar shell to form at least one first composite particle, and a plurality of white particles encapsulated in a plurality of insulating shells to form a plurality of second composite particles, and wherein at least one first composite particle and the plurality of second composite particles are dispersed in a dielectric fluid, and
   exposing the display medium to electromagnetic radiation to form an image.

16. The method according to claim 15 wherein the colored electrically photosensitive particles are photoactive particle electrophoresis particles.

17. The method according to claim 15 wherein at least one ambipolar shell is transparent or partially transparent.

18. The method according to claim 15 wherein the plurality of insulating shells are transparent or partially transparent.

19. The method according to claim 15 wherein the first and second electrodes are transparent.

20. The method according to claim 15 wherein subjecting comprises providing a source of potential having a negative terminal coupled to one of the first and second electrodes and a positive terminal coupled to the other of the first and second electrodes.

21. The method according to claim 15 wherein exposing comprises providing a laser diode array adjacent the second electrode and activating laser diodes in the laser diode array at desired positions to produce an image.

* * * * *